(12) United States Patent
Takeuchi et al.

(10) Patent No.: US 9,864,726 B2
(45) Date of Patent: Jan. 9, 2018

(54) INFORMATION PROCESSING APPARATUS, INFORMATION PROCESSING METHOD, AND NON-TRANSITORY COMPUTER-READABLE MEDIUM

(71) Applicant: Fuji Xerox Co., Ltd., Minato-ku, Tokyo (JP)

(72) Inventors: Takayuki Takeuchi, Kanagawa (JP); Hideto Yuzawa, Kanagawa (JP); Masahiro Sato, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 313 days.

(21) Appl. No.: 14/097,816

(22) Filed: Dec. 5, 2013

(65) Prior Publication Data

US 2014/0359100 A1    Dec. 4, 2014

(30) Foreign Application Priority Data

May 28, 2013    (JP) .................................. 2013-111926

(51) Int. Cl.
*G06F 15/173* (2006.01)
*G06F 11/30* (2006.01)
*G06F 11/00* (2006.01)

(52) U.S. Cl.
CPC ........ *G06F 15/17306* (2013.01); *G06F 11/00* (2013.01); *G06F 11/3062* (2013.01)

(58) Field of Classification Search
CPC .... G06F 1/3203; G06F 1/3206; G06F 1/3212; G06F 1/3228; H04W 52/0261;

(Continued)

(56) References Cited

U.S. PATENT DOCUMENTS 6,911,804 B2 * 6/2005 Mori ....................... G06F 1/263
                                                320/132
8,358,298 B2 * 1/2013 Lee ...................... G06F 1/3203
                                                345/211

(Continued)

FOREIGN PATENT DOCUMENTS

JP    2010-263537 A    11/2010
JP    2010-278576 A    12/2010
JP    2012-222914 A    11/2012

*Primary Examiner* — Phil Nguyen
*Assistant Examiner* — Brian J Corcoran
(74) *Attorney, Agent, or Firm* — Sughrue Mion, PLLC

(57) ABSTRACT

An information processing apparatus includes a determination unit, a first acceptance unit, a second acceptance unit, a measurement unit, a third acceptance unit, and a restriction unit. The determination unit determines whether information necessary for a meeting is to be downloaded. The first acceptance unit accepts first electric energy information indicating electric energy necessary to download the information. The second acceptance unit accepts second electric energy information indicating electric energy necessary to present the information in the meeting. The measurement unit measures remaining electric energy. The third acceptance unit accepts a result of subtraction of the electric energy indicated by the first electric energy information and the electric energy indicated by the second electric energy from the remaining electric energy. The restriction unit imposes, on the basis of the subtraction result, a restriction on a function in a first time period and in a second time period.

21 Claims, 8 Drawing Sheets

(58) Field of Classification Search
CPC ..... G06Q 10/06314; G06Q 10/063116; G06Q 10/1095
See application file for complete search history.

(56) References Cited

U.S. PATENT DOCUMENTS

| | | | | |
|---|---|---|---|---|
| 8,577,974 B2* | 11/2013 | Paulsami | ........... | G06Q 10/1095 709/206 |
| 8,639,232 B2* | 1/2014 | Rabii | ............... | H04W 52/0261 455/418 |
| 8,949,629 B2* | 2/2015 | Chakra | ..................... | G06F 1/28 713/300 |
| 9,070,273 B2* | 6/2015 | Lombardi | ............. | G08B 21/182 |
| 9,134,380 B2* | 9/2015 | Duncan | ............. | G01R 31/3648 |
| 2005/0268131 A1* | 12/2005 | Matsunobu | ............... | G06F 1/30 713/323 |
| 2006/0279256 A1* | 12/2006 | Bletsas | ................ | H02J 7/0047 320/128 |
| 2007/0226527 A1* | 9/2007 | Ang | .................. | H04M 1/72519 713/320 |
| 2008/0136654 A1* | 6/2008 | Toriello | ............. | G01R 31/3679 340/636.1 |
| 2008/0165714 A1* | 7/2008 | Dettinger | .......... | H04W 52/0261 370/311 |
| 2008/0172698 A1* | 7/2008 | Berger | .................. | G06F 1/3203 725/50 |
| 2008/0201587 A1* | 8/2008 | Lee | ....................... | G06F 1/3203 713/320 |
| 2008/0263375 A1* | 10/2008 | Sundstrom | ............ | G06F 1/3203 713/320 |
| 2009/0013204 A1* | 1/2009 | Kobayashi | ............ | G06F 1/3203 713/340 |
| 2009/0100256 A1* | 4/2009 | Fuccello | .............. | G06Q 10/109 713/100 |
| 2009/0187780 A1* | 7/2009 | Keohane | ................ | G06F 1/3203 713/324 |
| 2010/0063756 A1* | 3/2010 | Agrawal | ............ | G01R 31/3693 702/63 |
| 2010/0151918 A1* | 6/2010 | Annambhotla | .... | G01R 31/3648 455/573 |
| 2010/0162024 A1* | 6/2010 | Kuris | .................. | G06F 11/3062 713/340 |
| 2011/0040996 A1* | 2/2011 | Hackborn | ........... | G06F 11/3409 713/340 |
| 2011/0080422 A1* | 4/2011 | Lee | ....................... | G06F 1/3203 345/589 |
| 2011/0159931 A1* | 6/2011 | Boss | ................. | H04W 52/0264 455/574 |
| 2012/0265978 A1* | 10/2012 | Shenfield | ............. | G06F 9/4443 713/100 |
| 2012/0303990 A1* | 11/2012 | Nanda | .................. | G06F 1/3228 713/324 |
| 2013/0007662 A1* | 1/2013 | Bank | .................... | G06F 9/4443 715/811 |
| 2013/0067263 A1* | 3/2013 | Liu | .................... | H04W 52/0225 713/340 |
| 2013/0138989 A1* | 5/2013 | Jang | ........................ | G06F 1/28 713/340 |
| 2014/0075234 A1* | 3/2014 | Stekkelpak | ........ | H04M 1/72569 713/340 |
| 2014/0340051 A1* | 11/2014 | Hargrave | ............... | H02J 7/007 320/162 |

\* cited by examiner

FIG. 5

| EVENT ID | PRESENTER NECESSARY-CONTENT ID | PARTICIPANT NECESSARY ID | EVENT-START DATE AND TIME | EVENT-END DATE AND TIME | EVENT-PLACE ID | PRESENTER ID | SUPPORTER ID |
|---|---|---|---|---|---|---|---|
| 510 | 520 | 530 | 540 | 550 | 560 | 570 | 580 |
| | | | | | | | |

FIG. 6

| CONTENT ID 610 | CAPACITY 620 | DOWNLOAD TIME PERIOD 630 | PRESENTATION TIME PERIOD 640 |
|---|---|---|---|
| | | | |

| EVENT-PLACE ID 710 | EQUIPMENT-1 NAME 720 | UNIT ELECTRIC ENERGY CONSUMPTION 730 | EQUIPMENT-2 NAME 740 | UNIT ELECTRIC ENERGY CONSUMPTION 750 | ... |
|---|---|---|---|---|---|
| | | | | | |

700

INFORMATION PROCESSING APPARATUS, INFORMATION PROCESSING METHOD, AND NON-TRANSITORY COMPUTER-READABLE MEDIUM

CROSS-REFERENCE TO RELATED APPLICATIONS

This application is based on and claims priority under 35 USC 119 from Japanese Patent Application No. 2013-111926 filed May 28, 2013.

BACKGROUND

Technical Field

The present invention relates to an information processing apparatus, an information processing method, and a non-transitory computer-readable medium.

SUMMARY

According to an aspect of the invention, there is provided an information processing apparatus including a determination unit, a first acceptance unit, a second acceptance unit, a measurement unit, a third acceptance unit, and a restriction unit. The determination unit determines whether or not information necessary for a meeting is to be downloaded. When it is determined by the determination unit that the information is to be downloaded, the first acceptance unit performs an acceptance process of accepting first electric energy information indicating electric energy which is necessary to download the information. The second acceptance unit performs an acceptance process of accepting second electric energy information indicating electric energy which is necessary to present the information in the meeting. The measurement unit measures remaining electric energy which remains in the information processing apparatus that is to be used in the meeting. The third acceptance unit accepts a subtraction result of subtraction of the electric energy indicated by the first electric energy information and the electric energy indicated by the second electric energy from the remaining electric energy measured by the measurement unit. The restriction unit imposes, on the basis of the subtraction result accepted by the third acceptance unit, a restriction on a function in a first time period and in a second time period. The first time period is a time period to when the meeting starts. The second time period is a time period which is within a time period of the meeting and which is other than a time period for which the information is presented.

BRIEF DESCRIPTION OF THE DRAWINGS

An exemplary embodiment of the present invention will be described in detail based on the following figures, wherein:

FIG. 5 is an explanatory diagram illustrating an example of a data structure of an event-management-information table;

FIG. 6 is an explanatory diagram illustrating an example of a data structure of a content management table;

FIG. 7 is an explanatory diagram illustrating an example of a data structure of an equipment management table;

DETAILED DESCRIPTION

Hereinafter, an example of an exemplary embodiment for realizing the present invention will be described with reference to the drawings.

Figure 1:
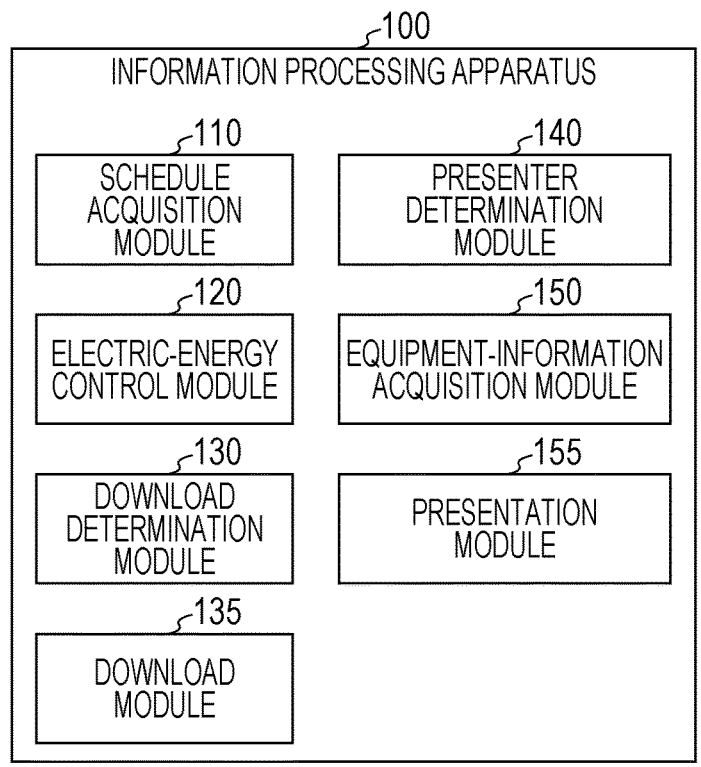
FIG. 1 is a module configuration diagram schematically illustrating an example of a configuration in a present exemplary embodiment.

FIG. 1 is a module configuration diagram schematically illustrating an example of a configuration in the present exemplary embodiment.

Note that the term "modules" refers to typically and logically separable components of software (a computer program), hardware, or the like. Accordingly, the term "modules" in the present exemplary embodiment refers to not only modules in a computer program, but also modules in a hardware configuration. Thus, in the present exemplary embodiment, a description of computer programs for functioning as the modules (a program for causing a computer to perform each procedure, a program for causing a computer to function as each unit, and a program for causing a computer to realize each function) is included, and a description of a system and method is also included. Note that, for convenience of description, the expression "store", the expression "cause an object to store", and expressions having meanings the same as those of the expressions are used. When an exemplary embodiment is realized using a computer program, the expressions mean "causing a storage device to store" or "performs control so that a storage device will be caused to store. Furthermore, modules may correspond to functions in a one-to-one manner. However, in a case of implementation, one module may be configured using one program, or multiple modules may be configured using one program. In contrast, one module may be configured using multiple programs. Moreover, multiple modules may be executed by one computer, or one module may be executed by multiple computers that are capable of operating in a distribution or parallel environment. Note that, in one module, another module may be included. Additionally, hereinafter, the term "connection" is used to express not only physical connection, but also logical connection (reception of data, instructions, reference relationships among data, and so forth). The expression "determined in advance" refers to "determined before" a target process is performed. The expression "determined in advance" not only includes "determined before" a process according to the exemplary embodiment starts, but also includes, in accordance with the current state and condition or in accordance with the previous state and condition, "determined before" a target process starts even after a process according to the exemplary embodiment has started. In the case where multiple "predetermined values" are present, the "predetermined values"

may be different from one another, or at least two of the values (as a matter of course, which include all of the values) may be the same. Furthermore, a description indicating that "when it is A, perform B" is used so as to indicate that "determine whether or not it is A, and, when it is determined that it is A, perform B". However, the case where determination of whether or not it is A is unnecessary is excluded.

In addition, the term "system" or the term "apparatus" refers to not only a system or apparatus having a configuration in which multiple computers, pieces of hardware, apparatuses, or the like are connected to each other via a communication medium such as a network (including communication connection established in a one-to-one manner), but also a system or apparatus that is realized by one computer, one piece of hardware, one apparatus, or the like. The term "apparatus" and the term "system" are used as terms having the same meaning. As a matter of course, the meaning of the term "system" does not include the meaning of only a social "mechanism" (a social system) that represents agreement among men.

Furthermore, target information is read from a storage device for each of processes that are performed by individual modules or for each of processes in a case in which the multiple processes are performed in a module. After the process is performed, a result of the process is written into the storage device. Accordingly, a description of reading from the storage device before the process is performed and writing into the storage device after the process is performed is omitted in some cases. Note that, here, examples of the storage device may include a hard disk (HD), a random-access memory (RAM), an external storage medium, a storage device that is connected via a communication line, and a register that is included in a central processing unit (CPU).

An image forming apparatus 100 according to the present exemplary embodiment is an apparatus used to present information in a meeting. As shown in the example illustrated in FIG. 1, the information processing apparatus 100 includes a schedule acquisition module 110, an electric-energy control module 120, a download determination module 130, a download module 135, a presenter determination module 140, an equipment-information acquisition module 150, and a presentation module 155.

Note that a meeting (hereinafter, referred to as an "event") is a situation in which multiple persons come together, and in which at least one person (presenter) makes a presentation using the information processing apparatus 100. Examples of the meeting include a product introduction, a paper presentation in a scientific society, a business talk, a lecture, a lesson, a report meeting, a conference, and an interview. The number of places at which the meeting takes place is not limited to one, and the meeting may take place at separate places such as videoconference.

Furthermore, the information processing apparatus 100 according to the present exemplary embodiment is an apparatus using a battery (which includes a primary battery and a secondary battery (an accumulator)) as a power source, and is, typically, a portable apparatus. The information processing apparatus 100 is to be used in a meeting that is a situation in which supply of power from a socket is impossible. Thus, the presenter needs to leave the remaining electric energy of the battery of the image forming apparatus 100 that the presenter uses so that the battery will be available for at least a presentation. In contrast, in the information processing apparatus 100, various functions (for example, a telephone function, a function of browsing a web page on the Internet, and so forth) are prepared. The image forming apparatus 100 is in an environment in which the battery is easily consumed.

The expression a module "accepts information" includes both the case where information is generated inside the module and where the module accepts the generated information, and the case where another module (which may be a module that is present in another information processing apparatus which is connected via a communication line) generates information and where the module accepts the generated information.

The schedule acquisition module 110 acquires a schedule from an electronic schedule book of a user of the information processing apparatus 100. For example, the schedule acquisition module 110 acquires a schedule of a meeting that is a target at a predetermined date and time (year, month, date, time, minute, second, and units following second or a combination of any of year, month, date, time, minute, second, and the units following second). The schedule acquisition module 110 activates an electric-energy control function in the present exemplary embodiment. In this case, for example, the schedule acquisition module 110 activates the electric-energy control function at eight o'clock in the morning, and acquires a meeting that will take place on the day, and a start time and an end time of the meeting. More specifically, the schedule acquisition module 110 acquires an event-management-information table 500. In the event-management-information table 500, identification information (hereinafter, referred to as "event identification (ID)") by which the meeting is uniquely identifiable in the present exemplary embodiment and so forth are stored. FIG. 5 is an explanatory diagram illustrating an example of a data structure of the event-management-information table 500. The event-management-information table 500 includes an event-ID column 510, a presenter-necessary-content-ID column 520, a participant-necessary-ID column 530, an event-start-date-and-time column 540, an event-end-date-and-time column 550, an event-place-ID column 560, a presenter-ID column 570, and a supporter-ID column 580. In the event-ID column 510, an event ID is stored. In the presenter-necessary-content-ID column 520, a content ID is stored, and is identification information by which contents (which may include application software described below) necessary in the event are uniquely identifiable in the present exemplary embodiment. In the participant-necessary-ID column 530, a user ID is stored, and is identification information by which a participant who will participate in the event is uniquely identifiable in the present exemplary embodiment. In the event-start-date-and-time column 540, a date and time at which the event will start is stored. In the event-end-date-and-time column 550, a date and time at which the event will end is stored. In the event-place-ID column 560, a place ID is stored, and is identification information by which a place at which the event will take place is uniquely identifiable in the present exemplary embodiment. In the presenter-ID column 570, a user ID indicating a person who will make a presentation in the event is stored. In the supporter-ID column 580, a user ID of a person who will support the presenter in the event is stored. Note that the event-management-information table 500 is stored in a schedule management module 210 that is described below using FIG. 2. The schedule acquisition module 110 acquires the event-management-information table 500 from the schedule management module 210. Whether or not the user ID of the user of the information processing apparatus 100 is included in the participant-necessary-ID column 530 is determined, and, when it is determined that the user ID of the user of the information processing apparatus 100 is included in the participant-necessary-ID column 530, the user of the information processing apparatus 100 is planning to participate in the event. Note that the user of the information processing apparatus 100 may be a person who will use the information processing apparatus 100, and examples of the user of the information processing apparatus 100 also include an owner of the information processing apparatus 100 (who may share the information processing apparatus 100 with other owners). Furthermore, in the case where the information processing apparatus 100 acquires the user ID of the user of the information processing apparatus 100, when the user is an owner of the information processing apparatus 100, the information processing apparatus 100 may acquire the user ID of the owner because the user ID of the owner is typically stored in the information processing apparatus 100. Furthermore, when the user is not an owner of the information processing apparatus 100, the information processing apparatus 100 may accept the user ID of the user. For example, the user may operate a keyboard, a touch panel, or the like of the information processing apparatus 100, whereby the information processing apparatus 100 may accept the user ID of the user. Alternatively, the information processing apparatus 100 may communicate with an IC card or the like that the user has, and may acquire the user ID that is stored in the IC card or the like.

The download determination module 130 determines whether or not information necessary for the meeting should be downloaded from a server, another information processing apparatus, or the like (for example, a content management module 220 described below) that stores the information. Examples of "information necessary for the meeting" include application software (for example, presentation software) that is necessary in order to make a presentation in the meeting, and contents, such as a document, that are contents which will be presented (note that, in the case of simply mentioning "contents", examples of the "contents" may include application software). Whether or not information necessary for the meeting should be downloaded is determined on the basis of whether or not the information (contents) is stored in the information processing apparatus 100. When the information is stored in the information processing apparatus 100, the download determination module 130 determines that the information does not need to be downloaded, and, when the information is not stored in the information processing apparatus 100, the download determination module 130 determines that the information should be downloaded. The "information necessary for the meeting" may be acquired, for example, from the presenter-necessary-content-ID column 520 that is included in the event-management-information table 500 acquired by the schedule acquisition module 110.

The download module 135 downloads, from the content management module 220 illustrated as an example in FIG. 2 described below, the contents that have been determined by the download determination module 130 to be contents which should be downloaded. The expression "control of the electric-energy control module 120" refers to control which is performed so that the electric-energy control module 120 decides a date and time at which the download module 135 starts downloading and the download module 135 starts downloading at the decided date and time.

When it is determined by the download determination module 130 that the information should be downloaded, the electric-energy control module 120 accepts first electric energy information indicating electric energy that is necessary to download the information. For example, the electric-energy control module 120 may use a content management table 600. FIG. 6 is an explanatory diagram illustrating an example of a data structure of the content management table 600. The content management table 600 includes a content-ID column 610, a capacity column 620, a download-time-period column 630, and a presentation-time-period column 640. In the content-ID column 610, a content ID is stored. In the capacity column 620, a storage capacity that is necessary to store the contents is stored. In the download-time column 630, a time period taken to download the contents is stored. In the present-time column 640, a time period for which the contents are presented (a time period taken to make a presentation using the contents) is stored. Note that the content management table 600 is stored in the content management module 220 that is described below using FIG. 2. The electric-energy control module 120 acquires the content management table 600 from the content management module 220. The electric-energy control module 120 calculates, using the value stored in the download-time column 630, electric energy consumption that is electric energy to be consumed in the information processing apparatus 100. For example, the electric-energy control module 120 may measure, in advance, electric energy consumption per unit that is necessary to download the contents, thereby obtaining a measured value, and may calculate, using the measured value, electric energy consumption that is necessary to download the contents. The value stored in the download-time-period column 630 may be adjusted in accordance with the transmission speed of a communication line that the information processing apparatus 100 is connected to. Furthermore, a time period taken to download the contents may be calculated using the value stored in the capacity column 620 and the transmission speed of a communication line that the information processing apparatus 100 is connected to.

Then, the electric-energy control module 120 accepts second electric energy information indicating electric energy that is necessary to present the information in the meeting. For example, the electric-energy control module 120 may use the content management table 600. The electric-energy control module 120 calculates, using the value stored in the presentation-time-period column 640, electric energy consumption that is electric energy to be consumed in the information processing apparatus 100. Note that the presentation time period is a so-called time period for which a presentation is made. The electric-energy control module 120 calculates, using the value stored in the presentation-time-period column 640, electric energy consumption that is electric energy to be consumed in the information processing apparatus 100. For example, the electric-energy control module 120 may measure, in advance, electric energy consumption per unit that is necessary to present the contents, thereby obtaining a measured value, and may calculate, using the measured value, electric energy consumption that is necessary to present the contents. Moreover, the presentation time period may be calculated on the basis of the time period of the meeting (an event time period 415 illustrated in FIG. 4). For example, the presentation time period may be calculated from the value stored in the event-start-date-and-time column 540 and the value stored in the event-end-date-and-time column 550. Alternatively, the presentation time period may be calculated on the basis of a document that is to be presented. For example, the total number of pages of the document may be multiplied by a predetermined coefficient, or a storage capacity (the value stored in the capacity column 620) that is necessary to store the document may be multiplied by a predetermined coefficient. Alternatively, the number of characters in each page may be multiplied by a predetermined coefficient, thereby obtaining a value for the page, and the values for the pages may be added to each other.

The electric-energy control module 120 measures the remaining electric energy that remains in the information processing apparatus 100 that is to be used in the meeting. In other words, the electric-energy control module 120 measures the current remaining electric energy of the battery that is built in the information processing apparatus 100. A technique of the related art may be used in measurement of the remaining electric energy.

Next, the electric-energy control module 120 accepts a result of subtraction of the electric energy indicated by the first electric energy information and the electric energy indicated by the second electric energy information from the remaining electric energy that has been measured. In other words, the electric energy that is necessary to present the information in the meeting (the electric energy that is to be used to download the contents which are necessary in the meeting and the electric energy that is to be used to present the contents) is subtracted from the current available electric energy, whereby electric energy that is available for things other than the presentation of the contents is calculated.

Then, the electric-energy control module 120 imposes, on the basis of a result of subtraction, restrictions on the functions in a first time period to when the meeting starts and in a second time period that is within the time period of the meeting and that is other than a time period for which the information (contents) is presented.

Furthermore, after the electric-energy control module 120 decides restrictions that are to be imposed on the functions in the second time period, the electric-energy control module 120 may decide restrictions that are to be imposed on the functions in the first time period. In other words, electric energy that is necessary after the event has started may be preferentially ensured, and electric energy that is necessary in a time period from the current time to when the event starts may be ensured. The reason for this is that, depending on imposition of restrictions on the functions after the event has started, more serious restrictions need to be imposed on the functions in the time period from the current time to when the event starts.

Furthermore, the electric-energy control module 120 may perform at least one of imposition of a restriction on the telephone function of the information processing apparatus 100, imposition of a restriction on a communication function of the image forming apparatus 100, imposition of a display function of a display of the information processing apparatus 100, and disconnection of the power of the information processing apparatus 100. For example, in the information processing apparatus 100 of a presenter, in the second time period, the electric-energy control module 120 performs imposition of a restriction on the telephone function of the information processing apparatus 100, and imposition of a restriction on the communication function of the information processing apparatus 100. The reason for this is that, during the event (more particularly, during the presentation), the information processing apparatus 100 should be made unable to perform another communication. In the information processing apparatus 100 of a supporter, in the second time period, the electric-energy control module 120 does not perform imposition of a restriction on the telephone function of the information processing apparatus 100, and imposition of a restriction on the communication function of the information processing apparatus 100. Instead of that, in the first time period, the electric-energy control module 120 performs imposition of a restriction on the display function of the display of the information processing apparatus 100. In this manner, the electric-energy control module 120 imposes, on electric energy in the first time period, a restriction that is more serious than a restriction to be imposed in the second time period. For example, in the first time period, the electric-energy control module 120 disconnects the power of the information processing apparatus 100.

Moreover, the electric-energy control module 120 decides a date and time at which the download module 135 starts downloading. The download module 135 starts downloading at the decided date and time.

The presenter determination module 140 determines whether or not the user of the information processing apparatus 100 is to perform a process of presenting the information in the meeting. For example, the presenter determination module 140 determines whether or not the user of the information processing apparatus 100 is a person (for example, a presenter) who is to present the contents using the information processing apparatus 100 in the meeting. More specifically, the presenter determination module 140 determines whether or not the user ID stored in the presenter-ID column 570 included in the event-management-information table 500 matches the user ID of the user of the information processing apparatus 100. When it is determined by the presenter determination module 140 that the user of the information processing apparatus 100 is to perform a process of presenting the information in the meeting, the electric-energy control module 120 performs a process of accepting the first electric energy information and the second electric energy information. The electric-energy control module 120 may perform a process of calculating the first electric energy information and the second electric energy information. Furthermore, when it is determined by the presenter determination module 140 that the user of the information processing apparatus 100 is not to perform a process of presenting the information in the meeting, the electric-energy control module 120 sets the electric energy indicated by the first electric energy information to be zero, and sets the electric energy indicated by the second electric energy information to be zero. In other words, the reason for this is that, in the case where the user of the information processing apparatus 100 is a presenter, a download process and a process of presenting information are necessary, but, in the case where the user of the information processing apparatus 100 is a participant other than the presenter, these processes are unnecessary.

Additionally, the presenter determination module 140 may determine whether or not the user of the information processing apparatus 100 is a supporter for a person who is to perform a process of presenting the information in the meeting. For example, the presenter determination module 140 determines whether or not the user of the information processing apparatus 100 is a supporter for the presenter in the meeting. More specifically, the presenter determination module 140 determines whether or not the user ID stored in the supporter-ID column 580 included in the event-management-information table 500 matches the user ID of the user of the information processing apparatus 100. When it is determined by the presenter determination module 140 that the user of the information processing apparatus 100 is a supporter for the person who is to perform a process of presenting the information in the meeting, the electric-energy control module 120 may distinguish the supporter from typical participants, and perform electric energy control for the supporter. In this manner, the electric-energy control module 120 may perform electric energy control in accordance with the user of the information processing apparatus 100. For example, in the case where the user of the information processing apparatus 100 is a supporter, the telephone function and the communication function are made available so that it will be possible to establish contact with the outside during the meeting. For this reason, the electric-energy control module 120 may impose a serious restriction on electric energy, for example, may impose a serious restriction (for example, disconnection of the power) on the functions before the meeting starts.

Note that the relationships between electric energy control and restrictions imposed on the functions will be described. Electric energy control is performed by imposing restrictions on the functions. Note that, in addition to, for example, making the telephone function or the like unavailable which is described above, examples of imposition of restrictions on the functions may include reduction of the brightness of the display of the information processing apparatus 100, reduction of the time period taken to shift to a sleep state, and reduction of the clock frequency of the CPU or the like.

The equipment-information acquisition module 150 acquires information concerning equipment that is present in a place (venue or the like) of the event. For example, the equipment-information acquisition module 150 acquires an equipment management table 700. FIG. 7 is an explanatory diagram illustrating an example of a data structure of the equipment management table 700. The equipment management table 700 includes, for example, an event-place-ID column 710, an equipment-1-name column 720, a unit-electric-energy-consumption column 730, an equipment-2-name column 740, and a unit-electric-energy-consumption column 750. In the event-place-ID column 710, an event place ID is stored. The event-place-ID column 710 corresponds to the event-place-ID column 560 of the event-management-information table 500. An event place ID is extracted from the event-place-ID column 560, and the corresponding event-place-ID column 710 is searched for the event place ID, whereby information concerning equipment that is present in the event place is acquired. In the equipment-1-name column 720, the name of equipment 1 that is present in the event place is stored. In the unit-electric-energy-consumption column 730, electric energy consumption per unit time in the case where the information processing apparatus 100 uses the equipment 1 is stored. In the equipment-2-name column 740, the name of equipment 2 that is present in the event place is stored. In the unit-electric-energy-consumption column 750, electric energy consumption per unit time in the case where the information processing apparatus 100 uses the equipment 2 is stored. In the case where another equipment is present, a combination that is similar to a combination of the equipment-1-name column 720 and the unit-electric-energy-consumption column 730 is continuously provided. Note that, in the unit-electric-energy-consumption column 730 or the like, a value for each type of information processing apparatus 100 may be stored. Note that the equipment management table 700 is stored in an equipment-information management module 230 that is described below using FIG. 2. The equipment-information acquisition module 150 acquires the equipment management table 700 from the content management module 220.

Then, the electric-energy control module 120 may calculate, using the equipment management table 700 acquired by the equipment-information acquisition module 150, electric energy that is necessary to present the information in the meeting. For example, in the case where the equipment 1 is a projector and it is determined that the projector is to be used, the electric-energy control module 120 may calculate, using the value stored in the unit-electric-energy-consumption column 730 and the above-described presentation time period, electric energy that is necessary to present the information. Regarding which equipment is to be used, for example, equipment that is available for the meeting is presented from the equipment management table 700 so that it will be possible to select equipment. Equipment may be decided by a selection operation performed by the user of the information processing apparatus 100. Furthermore, a column for equipment that is to be used is added to the event-management-information table 500, and equipment that is to be used in the event may be decided in advance.

The presentation module 155 provides functions that are necessary in the meeting. For example, in the case where the meeting takes place for a product introduction, the presentation module 155 provides, using application software, contents such as a document (which includes, for example, text, images, figures, and tables) or a moving image (which includes sounds) for the product instruction.

Figure 2:
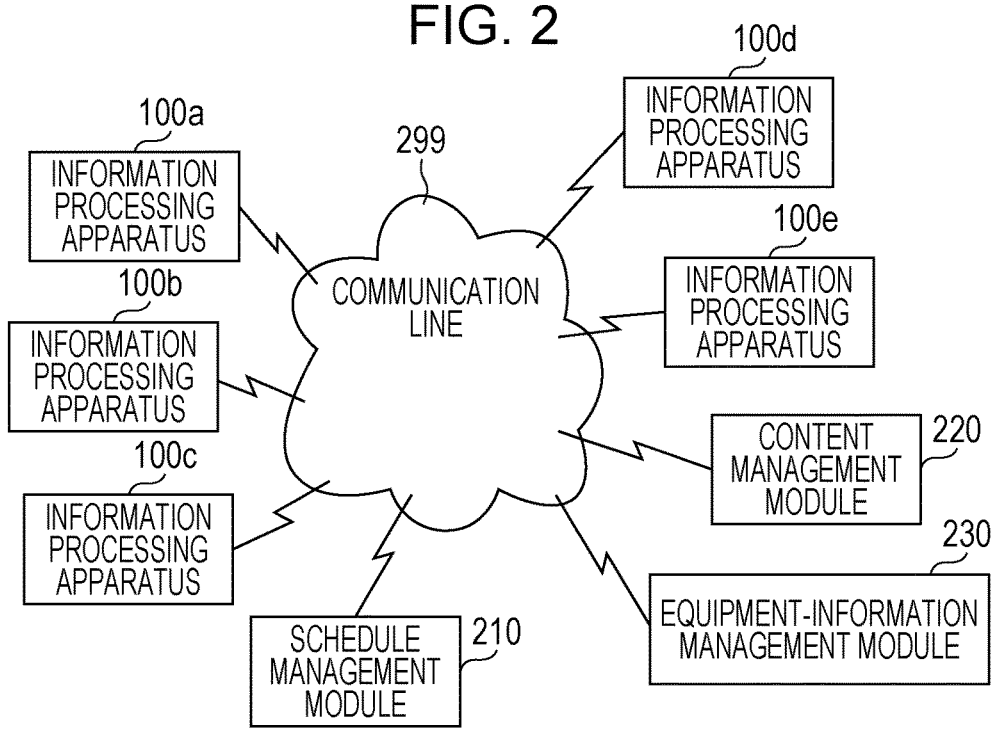
FIG. 2 is an explanatory diagram illustrating an example of a system configuration in the case where the present exemplary embodiment is realized.

FIG. 2 is an explanatory diagram illustrating an example of a system configuration in the case where the present exemplary embodiment is realized.

Information processing apparatuses 100a, 100b, 100c, 100d, 100e, and so forth, the schedule management module 210, the content management module 220, and the equipment-information management module 230 are connected to each other via a communication line 299. Whether the communication line 299 is a wireless line or wired line does not matter. The number of information processing apparatuses 100 may be at least one. Multiple schedule management modules 210, multiple content management modules 220, or multiple equipment-information management modules 230 may be provided. The schedule management module 210, the content management module 220, and the equipment-information management module 230 store the event-management-information table 500, the content management table 600, and the equipment management table 700, respectively.

Figure 3A:
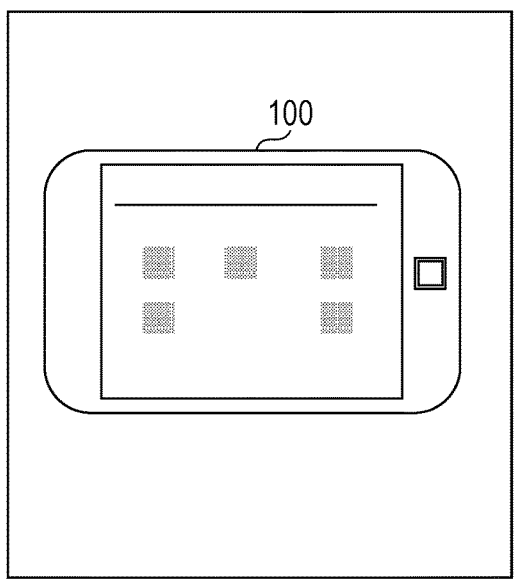
FIGS. 3A and 3B are explanatory diagrams illustrating an example of a situation in which the present exemplary embodiment is used.
Figure 3B:
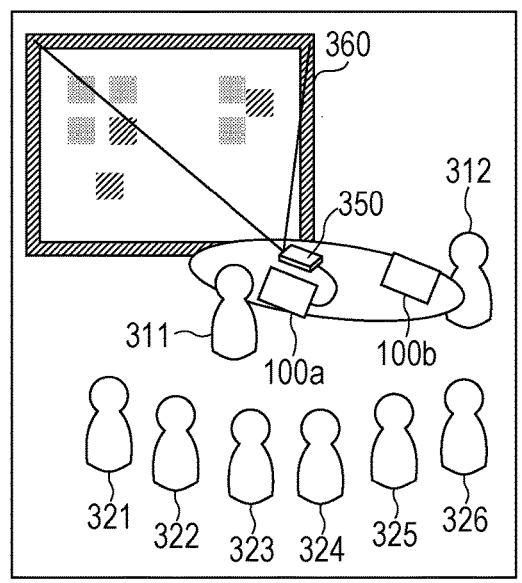

FIGS. 3A and 3B are explanatory diagrams illustrating an example of a situation in which the present exemplary embodiment is used. As shown in the example illustrated in FIG. 3A, the information processing apparatus 100 includes the display, a speaker, a microphone, the telephone function, the communication function, and so forth. An operator performs an operation using the touch panel or the like. The information processing apparatus 100 is a portable-type terminal apparatus, and examples of the portable-type terminal apparatus include, for example, a smartphone. In the event place, as illustrated in FIG. 3B, attendants 321, 322, and so forth are present, and a projector 350 and a white board 360 are placed. The presenter 311 has the information processing apparatus 100a. The presenter 311 connects the information processing apparatus 100a to the projector 350, and makes a presentation. Furthermore, an accompanying person 312 who is a supporter for the presenter 311 has the information processing apparatus 100b, and receives contact or the like from the outside. In addition, a supporter on the presenter-311 side may be present.

Figure 4:
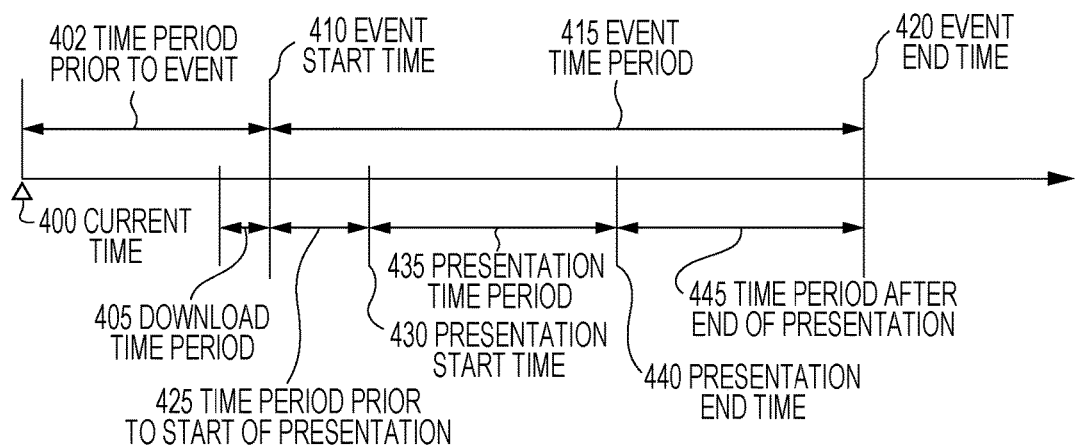
FIG. 4 is an explanatory diagram illustrating an example of a time schedule in the case where an event takes place.

FIG. 4 is an explanatory diagram illustrating an example of a time schedule in the case where the event takes place.

It is indicated that time proceeds from a current time 400 in the right direction. For example, at the current time 400, the schedule acquisition module 110 or the electric-energy control module 120 is activated. A time period from an event start time 410 to an event end time 420 is the event time period 415. A time period from the event start time 410 to a presentation start time 430 is a time period 425 prior to the start of a presentation. A time period from the presentation start time 430 to a presentation end time 440 is a presentation time period 435. A time period from the presentation end time 440 to the event end time 420 is a time period 445 after the end of the presentation. A download time period 405 may be before the event start time 410 (or before the presentation start time 430). Furthermore, multiple presentation time periods 435 may be present in the event time period 415.

In the case where it is necessary to download contents, the electric-energy control module 120 calculates electric energy X that is necessary in the download time period 405, and calculates electric energy YA that is necessary in the presentation time period 435. Then, electric energy that is a result of subtraction of the electric energy X and the electric energy YA from the remaining electric energy at the current time 400 is electric energy that is available for other time periods which are the time period 425 prior to the start of the presentation, the time period 445 after the end of the presentation, and the time period 402 prior to the event (excluding the download time period 405). At least, in order to ensure the electric energy X and the electric energy YA, restrictions are imposed on electric energy YB that is to be used in the time period 425 prior to the start of the presentation and the time period 445 after the end of the presentation and electric energy that is to be used in the time period 402 prior to the event. Note that, when the user of the information processing apparatus 100 is not a presenter (is a supporter), the electric energy YB is electric energy that is to be used in the event time period 415.

Figure 8:
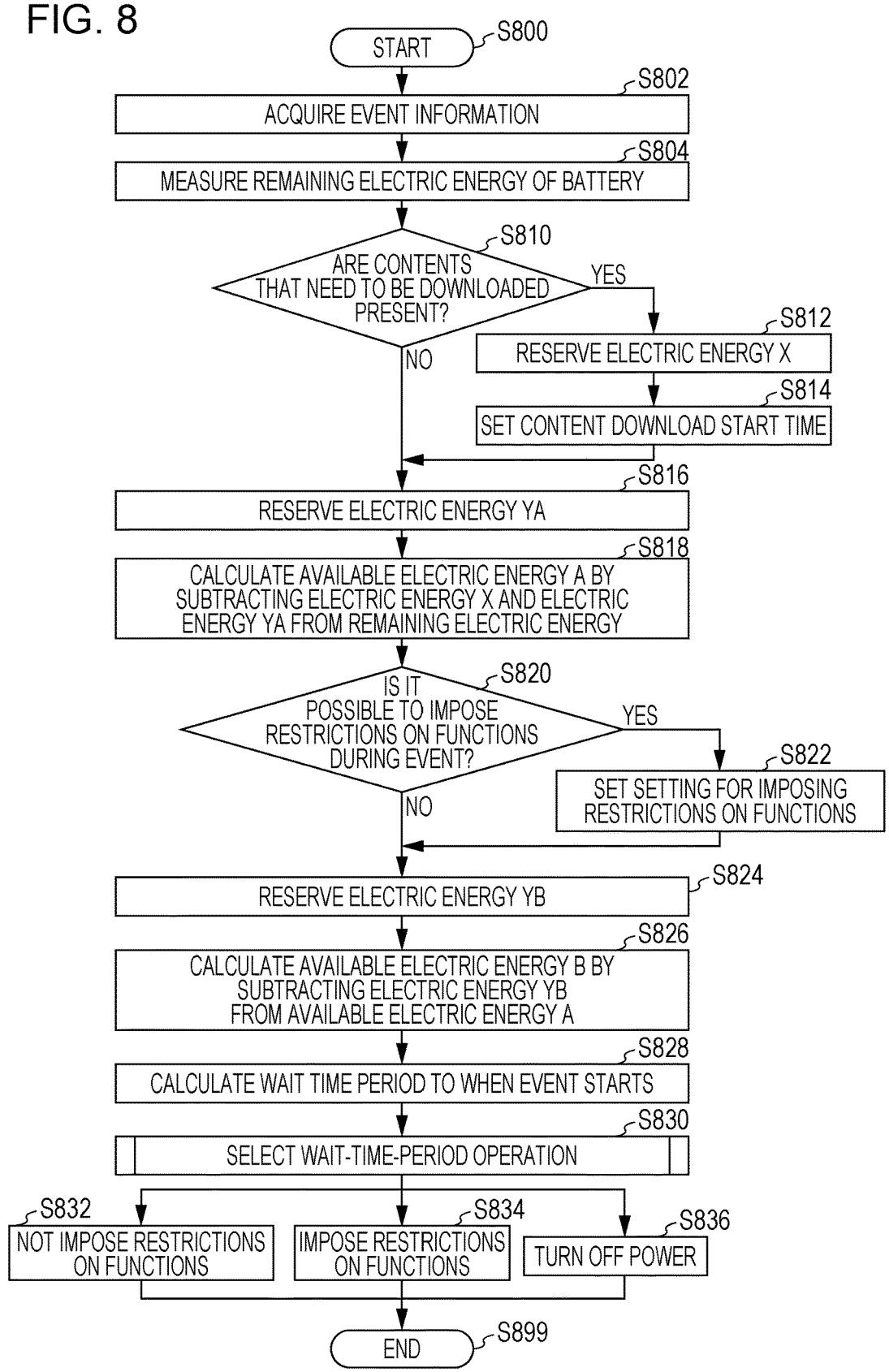
FIG. 8 is a flowchart illustrating an example of a process in the present exemplary embodiment.

FIG. 8 is a flowchart illustrating an example of a process in the present exemplary embodiment.

In step S802, the schedule acquisition module 110 acquires event information.

In step S804, the electric-energy control module 120 measures the remaining electric energy of the battery.

In step S810, the download determination module 130 determines whether or not contents that need to be downloaded are present. When contents that need to be downloaded are present, the process proceeds to step S812. Otherwise, the process proceeds to step S816.

In step S812, the electric-energy control module 120 reserves the electric energy X (electric energy that is to be used in the download time period 405).

In step S814, the electric-energy control module 120 sets a content download start time.

In step S816, the electric-energy control module 120 reserves the electric energy YA (electric energy that is to be used in the presentation time period 435).

In step S818, the electric-energy control module 120 subtracts the electric energy X and the electric energy YA from the remaining electric energy, thereby calculating available electric energy A.

In step S820, the electric-energy control module 120 determines whether or not it is possible to impose restrictions on the functions during the event. When it is possible to impose restrictions on the functions during the event, the process proceeds to step S822. Otherwise, the process proceeds to step S824. For example, the electric-energy control module 120 may decide, on the basis of an operation performed by the operator, whether or not it is possible to impose restrictions of the functions of the information processing apparatus 100 during the event (the event time period 415). Furthermore, when the available electric energy A is lower than a predetermined value E, the process may forcibly proceed to step S822.

In step S822, the electric-energy control module 120 sets a setting for imposing restrictions on the functions in the event time period 415. For example, the electric-energy control module 120 may select, on a basis of an operation performed by the operator, among the functions, functions that restrictions are to be imposed on. Furthermore, the electric-energy control module 120 may decide, in a predetermined order, among the functions, functions that restrictions are to be imposed on. For example, verification is performed in the order of imposition of a restriction on the telephone function of the information processing apparatus 100, imposition of a restriction on the communication function of the information processing apparatus 100, imposition of a restriction on the display function of the display of the information processing apparatus 100, and disconnection of the power of the information processing apparatus 100. Regarding verification, in the case where electric energy that is equal to or higher than a predetermined value E has been ensured by imposing a restriction on a function, restrictions may be imposed on functions up to the function in the order.

In step S824, the electric-energy control module 120 reserves the electric energy YB (electric energy that is to be used in the time period 425 prior to the start of the presentation and the time period 445 after the end of the presentation). When the process of step S822 is performed (YES in step S820), electric energy in the case where restrictions are imposed on the functions is the electric energy YB. When a result of determination in step S820 is NO, electric energy in the case where imposition of restrictions on the functions is unnecessary is the electric energy YB.

In step S826, the electric-energy control module 120 subtracts the electric energy YB from the available electric energy A, thereby calculating available electric energy B (electric energy that is available for the time period 402 prior to the event (excluding the download time period 405)).

In step S828, the electric-energy control module 120 calculates a wait time period to when the event starts. In other words, the electric-energy control module 120 calculates a time period (the time period 402 prior to the event that is a time period excluding the download time period 405) from the current time 400 to the event start time 410.

In step S830, the electric-energy control module 120 performs selection of a wait-time-period operation. The electric-energy control module 120 multiplies the wait time period, which has been calculated in step S828, by a predetermined coefficient (electric energy consumption per unit time), thereby calculating electric energy in the wait time period. Here, the "electric energy consumption per unit time" may be an overall statistical value (for example, an average value, a mode value, or a medium value) that is measured in advance. Alternatively, a statistical value that is measured in advance in the time period prior to the event may be used. When a result of calculation is equal to or higher than a predetermined value F, the process proceeds to step S832. When the result of calculation is lower than a predetermined value G, the process proceeds to step S836. Otherwise (when the result of calculation is lower than the predetermined value F and equal to or higher than the predetermined value G), the process proceeds to step S834. Note that there is a relationship that the value E>the value F>the value G.

In step S832, the electric-energy control module 120 does not impose restrictions on the functions.

In step S834, the electric-energy control module 120 imposes restrictions on the functions. For example, the electric-energy control module 120 imposes restrictions on the functions in the order from imposition of a restriction on the telephone function of the information processing apparatus 100, imposition of a restriction on the communication function of the information processing apparatus 100, and imposition of a restriction on the display function of the display of the information processing apparatus 100.

In step S836, the electric-energy control module 120 turns off the power.

Figure 9A:
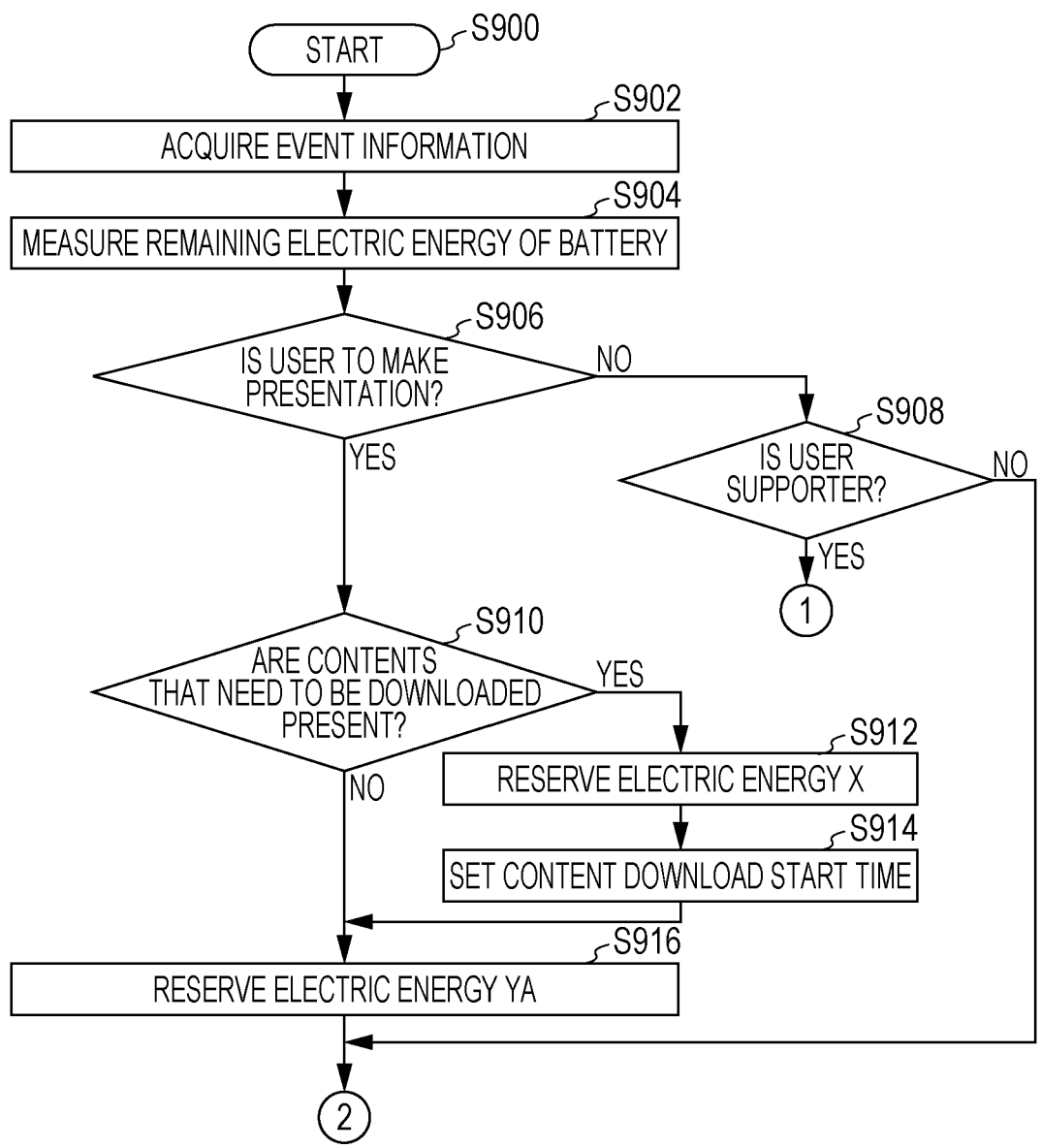
FIGS. 9A and 9B are parts of a flowchart illustrating an example of a process in the present exemplary embodiment.
Figure 9B:
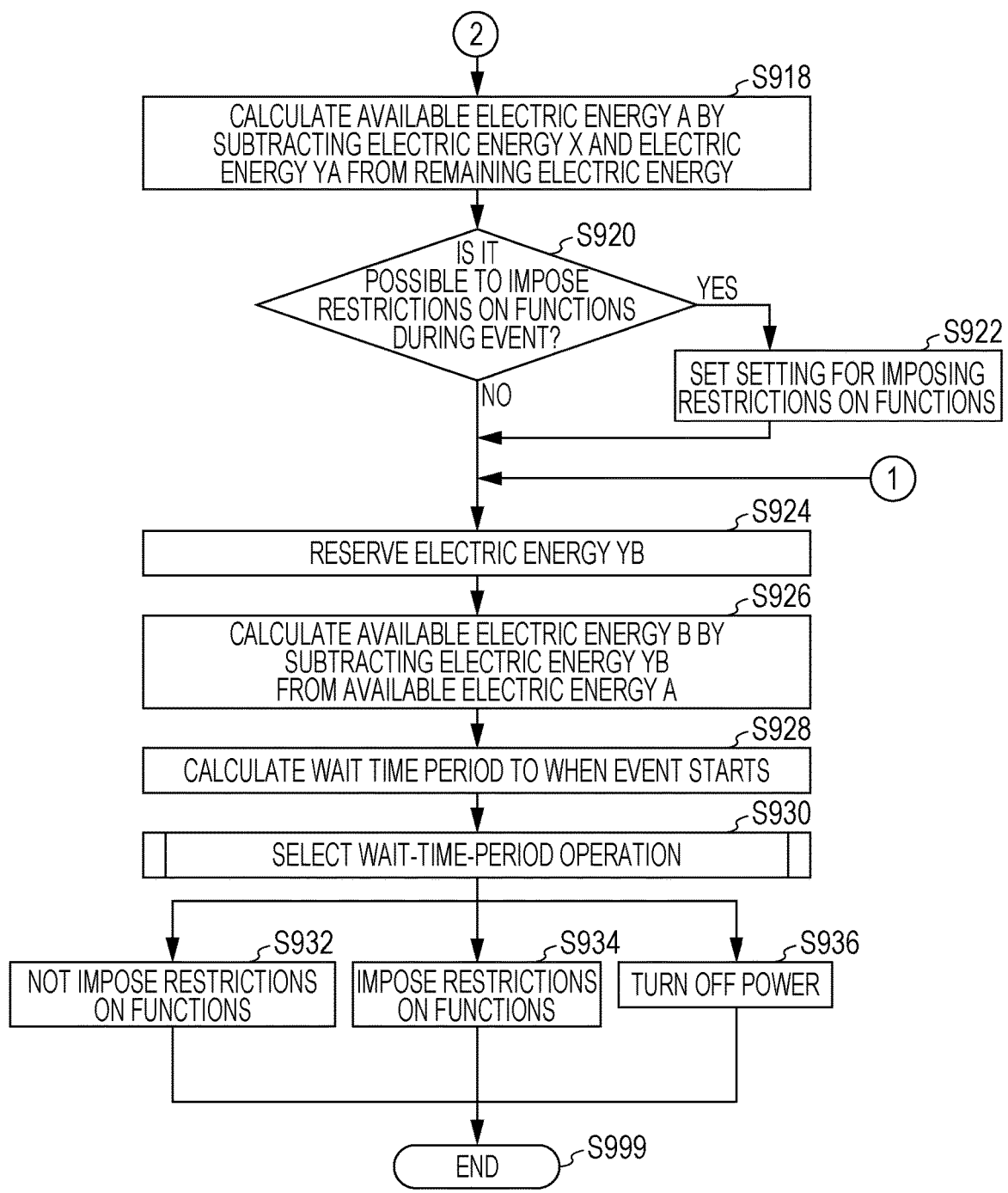

FIGS. 9A and 9B are parts of a flowchart illustrating an example of a process in the present exemplary embodiment. Processes of steps S906 and S908 are added to the flowchart shown in the example illustrated in FIG. 8. The processes of the other steps are similar to those illustrated in FIG. 8.

In step S906, the presenter determination module 140 determines whether or not the user of the information processing apparatus 100 is to make a presentation. When the user of the information processing apparatus 100 is to make a presentation, the process proceeds to step S910. Otherwise, the process proceeds to step S908.

In step S908, the presenter determination module 140 determines whether or not the user of the information processing apparatus 100 is a supporter. When the user of the information processing apparatus 100 is a supporter, the process proceeds to step S924. Otherwise, the process proceeds to step S918.

Accordingly, when the user of the information processing apparatus 100 is not a presenter, reservation of the electric energy X and the electric energy YA is unnecessary. When the user of the information processing apparatus 100 is a supporter, restrictions are not imposed on the functions in the event time period 415. Note that no restriction may be imposed on the telephone function of the information processing apparatus 100, and no restriction may be imposed on the communication function of the information processing apparatus 100. For example, only imposition of a restriction on the display function of the display of the information processing apparatus 100 may be performed.

Figure 10:
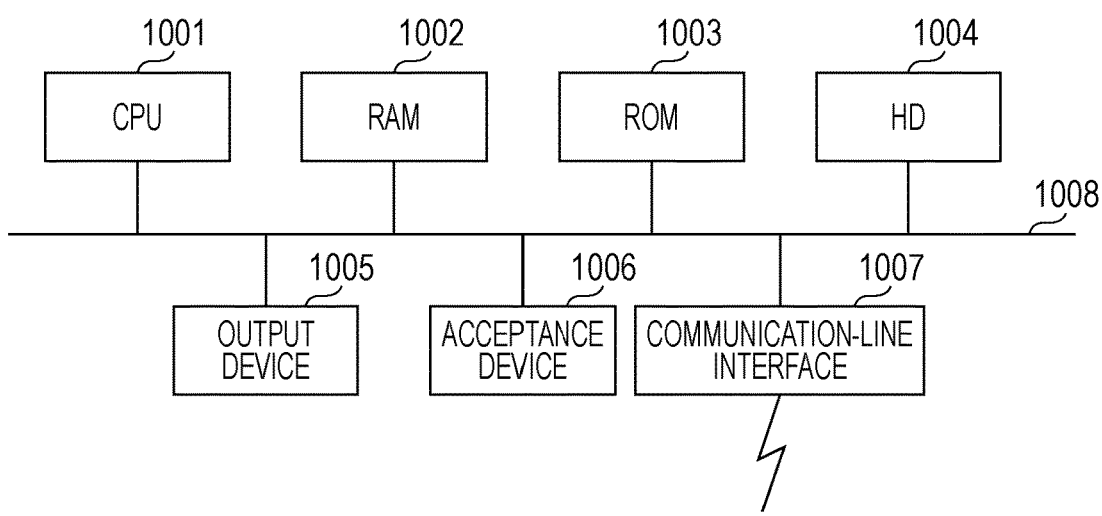
FIG. 10 is a block diagram illustrating an example of a hardware configuration of a computer that realizes the present exemplary embodiment.

Note that, regarding a hardware configuration of a computer in which a program is executed so as to function as the information processing apparatus 100, the schedule management module 210, the content management module 220, and the equipment-information management module 230, as illustrated as an example in FIG. 10, the computer is a typical computer, and, more specifically, is, for example, a computer that is usable as a personal computer or a server. In other words, for example, a CPU 1001 is used as a processing unit (a computation unit), and a RAM 1002, a read-only memory (ROM) 1003, and an HD 1004 are used as storage devices. For example, a hard disk may be used as the HD 1004. The computer is constituted by the CPU 1001, the RAM 1002, the ROM 1003, the HD 1004, an acceptance device 1006, an output device 1005, a communication-line interface 1007, and a bus 1008. The CPU 1001 executes a program so as to function as the schedule acquisition module 110, the electric-energy control module 120, the download determination module 130, the download module 135, the presenter determination module 140, the equipment-information acquisition module 150, the presentation module 155, and so forth. The RAM 1002 stores the program and data. The ROM 1003 stores, for example, a program for activating the present computer. The HD 1004 is an auxiliary storage device (which may be a flash memory or the like). The acceptance device 1006 accepts data on the basis of an operation that has been performed by a user on a keyboard, a mouse, a touch panel, or the like. The output device 1005 is a cathode ray tube (CRT), a liquid crystal display, or the like. The communication-line interface 1007 is used to connect the computer with a communication network, such as a network interface card. The bus 1008 connects the CPU 1001, the RAM 1002, the ROM 1003, the HD 1004, the acceptance device 1006, the output device 1005, and the communication-line interface 1007 so that data will be transmitted/received. Multiple computers each of which is the computer may be connected to each other using a network.

Regarding realization of the above-described exemplary embodiment using a computer program, a system having the present hardware configuration is caused to read the computer program that is software, and software resource and hardware resource collaborate with each other, thereby realizing the above-described exemplary embodiment.

Note that the hardware configuration illustrated in FIG. 10 is one configuration example. The hardware configuration in the present exemplary embodiment is not limited to the hardware configuration illustrated in FIG. 10. It is only necessary that the hardware configuration be a configuration in which the modules that are described in the present exemplary embodiment are executable. For example, some modules may be configured using dedicated hardware (for example, an application specific integrated circuit (ASIC)). A configuration in which some modules are provided in an external system and connected via a communication line may be used. Further, multiple systems each of which is the system illustrated in FIG. 10 may be connected to each other via a communication line, and may operate in collaboration with each other. Furthermore, particularly, the system may be incorporated in a mobile phone (examples of the mobile phone include a smartphone) as a mobile information terminal, or a personal computer. Alternatively, the system may be incorporated in an information home appliance, a copier, a facsimile machine, a scanner, a printer, a multifunctional machine (an image processing apparatus having at least two functions among a scanner function, a printer function, a copier function, a facsimile function, and so forth), or the like.

Furthermore, in the description of the foregoing exemplary embodiment, in the case of comparison a value with a predetermined value, "equal to or larger than", "equal to or smaller than", "larger than", and "smaller than" may be replaced with "larger than", "smaller than", "equal to or larger than", and "equal to or smaller than", respectively, as long as the combination of the value and the predetermined value does not have a contradiction.

Note that the above-described program may be stored on a recording medium, and may be supplied. Furthermore, the program may be supplied using a communication unit. In such a case, for example, regarding the above-described program, it may be considered that a "computer readable recording medium storing a program" is provided as an invention.

The "computer readable recording medium storing a program" is a recording medium which is used to install a program, to execute a program, to distribute a program, or the like, in which a program is stored, and which is readable by a computer.

Note that examples of the recording medium include the following: digital versatile discs (DVDs) including "a DVD-recordable(R), a DVD-rewritable(RW), a DVD-RAM, and so forth", which are standards established by the DVD forum, and including "a DVD+R, a DVD+RW, and so forth" which are standards established by the DVD+RW Alliance; compact discs (CDs) including a CD-ROM, a CD-R, a CD-RW, and so forth; a Blu-ray Disc (registered trademark);

a magneto-optical disk (MO); a flexible disk (FD); a magnetic tape; an HD; a ROM; an electrically erasable programmable read-only memory (EEPROM (registered trademark)); a flash memory; a RAM; and a secure digital (SD) memory card.

Additionally, the above-described program or one portion thereof may be recorded on the recording medium, and may be stored, distributed, or the like. Furthermore, the above-described program may be transmitted by communication using a transmission medium such as a wired network, a wireless communication network, or a combination of a wired network and a wireless communication network. The transmission medium is used, for example, in the following: a local area network (LAN); a metropolitan area network (MAN); a wide area network (WAN); the Internet; an intranet; and an extranet. Moreover, the above-described program may be transported by being superimposed on a carrier wave.

In addition, the above-described program may be one portion of another program. Alternatively, the above-described program may be recorded on a recording medium together with another program. Furthermore, the above-described program may be divided into programs, and the programs may be recorded on multiple recording media. Moreover, the above-described program may be recorded in any manner, such as compression or encryption, if the above-described program that has been recorded is restorable.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   at least one central processing unit (CPU) configured to:
   determine whether or not information necessary for a meeting is to be downloaded;
   when it is determined that the information is to be downloaded, acquire first electric energy information indicating first electric energy which is necessary to download the information;
   acquire second electric energy information indicating second electric energy which is necessary to present the information in the meeting;
   measure a remaining electric energy which remains in the information processing apparatus that is to be used in the meeting;
   subtract the first electric energy and the second electric energy from the measured remaining electric energy; and
   based on the subtraction result, impose a first restriction on a function of the information processing apparatus in a first time period and impose a second restriction on a function of the information processing apparatus in a second time period, the first time period being a time period from a current time to a time when the meeting starts, the second time period being a time period which is within a time period of the meeting and which is other than a time period for which the information is presented,
   wherein the first restriction is different than the second restriction, and
   wherein the first time period and the second time period are preset by the at least one CPU based on an event schedule, and
   wherein the at least one CPU is further configured to determine whether the event schedule indicates a first case in which a user identification (ID) of a user of the information processing apparatus matches a first user ID indicated in the event schedule as scheduled to present the information during the meeting and to determine whether the event schedule indicates a second case in which the user ID matches a second user ID indicated in the event schedule as being scheduled to attend the meeting without presenting the information,
   wherein the first restriction and the second restriction are each greater in the first case than in the second case,
   wherein the at least one CPU is further configured to determine whether the event schedule indicates a third case in which the user ID matches a third ID indicated in the event schedule as being scheduled to support a user corresponding to the first ID by executing an application on the information processing apparatus, and
   each of the first restriction and the second restriction in the third case is less than in the first case and greater than in the second case.

2. The information processing apparatus according to claim 1, wherein the at least one CPU determines the first restriction to be imposed in the first time period after the at least one CPU determines the second restriction that is to be imposed in the second time period.

3. The information processing apparatus according to claim 1, wherein the at least one CPU determines whether or not a user of the information processing apparatus is to present the information in the meeting,
   wherein, in response to a determination that the user is to present, the at least one CPU acquires the first and second electric energy information.

4. The information processing apparatus according to claim 2,
   wherein, in response to a determination that the user is to present the information during the meeting, the at least one CPU acquires the first and second electric energy information.

5. The information processing apparatus according to claim 3, wherein, in response to a determination that the user is not to present the information during the meeting, the at least one CPU sets the first electric energy indicated by the first electric energy information to zero, and sets the second electric energy indicated by the second electric energy information to zero.

6. The information processing apparatus according to claim 4, wherein, in response to a determination that the user is not to present the information during the meeting, the at least one CPU sets the first electric energy indicated by the first electric energy information to zero, and sets the second electric energy indicated by the second electric energy information to zero.

7. The information processing apparatus according to claim 1, wherein each of the first restriction and the second restriction comprises at least one of restricting a telephone function of the information processing apparatus, restricting a communication function of the information processing apparatus, restricting a display function of a display of the information processing apparatus, and disconnecting power of the information processing apparatus.

8. The information processing apparatus according to claim 2, wherein each of the first restriction and the second restriction comprises at least one of restricting a telephone function of the information processing apparatus, restricting a communication function of the information processing apparatus, restricting a display function of a display of the information processing apparatus, and disconnecting power of the information processing apparatus.

9. The information processing apparatus according to claim 3, wherein each of the first restriction and the second restriction comprises at least one of restricting a telephone function of the information processing apparatus, restricting a communication function of the information processing apparatus, restricting a display function of a display of the information processing apparatus, and disconnecting power of the information processing apparatus.

10. The information processing apparatus according to claim 4, wherein each of the first restriction and the second restriction comprises at least one of restricting a telephone function of the information processing apparatus, restricting a communication function of the information processing apparatus, restricting a display function of a display of the information processing apparatus, and disconnecting power of the information processing apparatus.

11. The information processing apparatus according to claim 5, wherein each of the first restriction and the second restriction comprises at least one of restricting a telephone function of the information processing apparatus, restricting a communication function of the information processing apparatus, restricting a display function of a display of the information processing apparatus, and disconnecting power of the information processing apparatus.

12. The information processing apparatus according to claim 6, wherein each of the first restriction and the second restriction comprises at least one of restricting a telephone function of the information processing apparatus, restricting a communication function of the information processing apparatus, restricting a display function of a display of the information processing apparatus, and disconnecting power of the information processing apparatus.

13. The information processing apparatus according to claim 1, wherein the first restriction is greater than the second restriction.

14. The information processing apparatus according to claim 1, wherein the at least one CPU is further configured to disable a telephone function of the information processing apparatus in the first case during the meeting and to not disable the telephone function of the information processing apparatus in the third case during the meeting.

15. The information processing apparatus according to claim 1, wherein the at least one CPU is further configured to determine the first case in which the user of the information processing apparatus is scheduled to present the information during the meeting as an indication that the user is scheduled to provide the information to at least another user during the meeting, and
the at least one CPU is further configured to determine the second case in which the user is scheduled to attend the meeting without presenting the information as an indication that the user is not scheduled to provide the information to at least the other user during the meeting.

16. The information processing apparatus according to claim 1, wherein the event schedule comprises the first ID, the second ID, the third ID with respectively different identifiers from each other.

17. The information processing apparatus according to claim 1, wherein the event schedule is shared among a plurality of information processing apparatuses, including the information processing apparatus.

18. An information processing method comprising:
determining whether or not information necessary for a meeting is to be downloaded;
when it is determined that the information is to be downloaded, acquiring first electric energy information indicating first electric energy which is necessary to download the information;
acquiring second electric energy information indicating second electric energy which is necessary to present the information in the meeting;
measuring a remaining electric energy that remains in the information processing apparatus which is to be used in the meeting;
subtracting the first electric energy and the second electric energy from the measured remaining electric energy;
based on the subtraction result, performing a first restriction on a function of the information processing apparatus in a first time period and performing a second restriction on a function of the information processing apparatus in a second time period, the first time period being a time period from a current time to a time when the meeting starts, the second time period being a time period which is within a time period of the meeting and which is other than a time period for which the information is presented;
determining whether an event schedule indicates a first case in which a user identification (ID) of a user of the information processing apparatus matches a first user ID indicated in the event schedule as being scheduled to present the information during the meeting and to determine whether the even schedule indicates a second case in which the user ID matches a second user ID indicated in the event schedule as being scheduled to attend the meeting without presenting the information; and
determining whether the event schedule indicates a third case in which the user ID matches a third ID indicated in the event schedule as being scheduled to support a user corresponding to the first ID by executing an application on the information processing apparatus,
wherein the first restriction and the second restriction are each greater in the first case than in the second case,
wherein the first restriction is different than the second restriction,
wherein the first time period and the second time period are preset based on the event schedule,
wherein each of the first restriction and the second restriction in the third case is less than in the first case and greater than in the second case.

19. The information processing method according to claim 18, wherein the first restriction is greater than the second restriction.

20. A non-transitory computer readable medium storing a program causing a computer to execute a process, the process comprising:
determining whether or not information necessary for a meeting is to be downloaded;

when it is determined that the information is to be downloaded, acquiring first electric energy information indicating first electric energy which is necessary to download the information;

acquiring second electric energy information indicating second electric energy which is necessary to present the information in the meeting;

measuring a remaining electric energy that remains in the information processing apparatus which is to be used in the meeting;

subtracting the first electric energy and the second electric energy from the measured remaining electric energy;

based on the subtraction result, performing a first restriction on a function of the information processing apparatus in a first time period and performing a second restriction on a function of the information processing apparatus in a second time period, the first time period being a time period from a current time to a time when the meeting starts, the second time period being a time period which is within a time period of the meeting and which is other than a time period for which the information is presented;

determining whether an event schedule indicates a first case in which a user identification (ID) of a user of the information processing apparatus matches a first user ID indicated in the event schedule as being scheduled to present the information during the meeting and to determine whether the even schedule indicates a second case in which the user ID matches a second user ID indicated in the event schedule as being scheduled to attend the meeting without presenting the information; and determining whether the event schedule indicates a third case in which the user ID matches a third ID indicated in the event schedule as being scheduled to support a user corresponding to the first ID by executing an application on the information processing apparatus, wherein the first restriction and the second restriction are each greater in the first case than in the second case, wherein the first restriction is different than the second restriction, wherein the first time period and the second time period are preset based on the event schedule, wherein each of the first restriction and the second restriction in the third case is less than in the first case and greater than in the second case.

21. The computer readable medium according to claim 20, wherein the first restriction is greater than the second restriction.

* * * * *